United States Patent
Tsuruoka et al.

(10) Patent No.: US 7,703,697 B2
(45) Date of Patent: Apr. 27, 2010

(54) LIQUID DISCHARGE APPARATUS AND METHOD FOR ALIGNING NEEDLE-LIKE SUBSTANCES

(75) Inventors: Yuji Tsuruoka, Kanagawa (JP); Kazuo Iwata, Kanagawa (JP); Takashi Mori, Tokyo (JP); Hidehito Takayama, Kanagawa (JP); Eiichi Motai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 740 days.

(21) Appl. No.: 10/990,608

(22) Filed: Nov. 17, 2004

(65) Prior Publication Data

US 2005/0104932 A1    May 19, 2005

(30) Foreign Application Priority Data

Nov. 19, 2003    (JP)    ............... 2003-389305

(51) Int. Cl.
    *B05B 1/08* (2006.01)
(52) U.S. Cl. .............. 239/102.1; 239/124; 239/135; 239/592; 239/601; 264/108
(58) Field of Classification Search .............. 239/102.2, 239/120, 124, 128, 135, 592–594, 601, 102.1, 239/125; 246/108, 171.1, DIG. 26
    See application file for complete search history.

(56) References Cited

U.S. PATENT DOCUMENTS

| | | | | |
|---|---|---|---|---|
| 3,198,442 A | * | 8/1965 | Brenner | 239/601 |
| 3,432,295 A | * | 3/1969 | Frank et. al. | 419/19 |
| 4,463,359 A | * | 7/1984 | Ayata et al. | 347/56 |
| 4,521,360 A | * | 6/1985 | Fiorentino | 264/108 |
| 5,477,249 A | * | 12/1995 | Hotomi | 347/48 |
| 5,828,393 A | * | 10/1998 | Hotomi | 347/71 |
| 6,036,302 A | * | 3/2000 | Hotomi | 347/55 |
| 6,260,954 B1 | * | 7/2001 | Lima-Marques | 347/55 |
| 6,299,812 B1 | * | 10/2001 | Newman et al. | 264/176.1 |
| 6,471,326 B2 | * | 10/2002 | Tachihara et al. | 347/19 |
| 6,685,301 B2 | * | 2/2004 | Eida et al. | 347/45 |
| 6,741,017 B1 | | 5/2004 | Ide et al. | |
| 6,764,628 B2 | * | 7/2004 | Lobovsky et al. | 264/172.15 |
| 7,198,745 B2 | * | 4/2007 | Newman et al. | 264/176.1 |
| 2003/0117065 A1 | | 6/2003 | Okal et al. | |

FOREIGN PATENT DOCUMENTS

| | | |
|---|---|---|
| JP | 2000-208026 A | 7/2000 |
| JP | 2001-195972 A | 7/2001 |

* cited by examiner

*Primary Examiner*—Len Tran
*Assistant Examiner*—Jason J Boeckmann
(74) *Attorney, Agent, or Firm*—Canon USA Inc IP Div

(57) ABSTRACT

A liquid discharge apparatus for aligning needle-like structures. The apparatus includes a tapered nozzle having an entrance and a discharge opening. The nozzle is tapered in such a manner that its diameter decreases towards the discharge opening. The diameter of the nozzle at the entrance is larger than the length of the needle-like structures, and the diameter of the discharge opening is larger than the diameter of the needle-like structures and smaller than the length of the needle-like structures. By passing through the nozzle, the needle-like structures are aligned.

5 Claims, 4 Drawing Sheets

LIQUID DISCHARGE APPARATUS AND METHOD FOR ALIGNING NEEDLE-LIKE SUBSTANCES

CROSS REFERENCE

This application claims priority from Japanese Patent Application No. 2003-389305 filed Nov. 19, 2003, which is hereby incorporated by reference herein. This application is related to U.S. application Ser. No. 10/991,105, entitled "Method for Aligning Needle-like Structures and Alignment Unit," filed Nov. 17, 2004, which is hereby incorporated by reference herein.

BACKGROUND OF THE INVENTION

1. Field of the Invention

The present invention relates to a liquid discharge apparatus which discharges a disperse liquid containing dispersed needle-like structures to a substrate or the like, thereby aligning the needle-like structures, and to a method for aligning the needle-like structures.

2. Description of the Related Art

Recent attention-getting carbon nanotubes, which represent needle-like structures, have structures in which $sp^2$ carbons, which constitute a graphitic structure, bonded in a plane are rolled into a cylinder on the order of nanometers. The carbon nanotubes have many superior characteristics, and accordingly have been used in various applications. In particular, the carbon nanotubes are often used in electrical materials because of their electrical characteristic in which they can be well conductive or semiconductive. One application of the carbon nanotubes is to use them in MOS transistors.

FIG. 8 is a schematic illustration of a known MOS transistor. For fabrication of the MOS transistor, a plurality of carbon nanotubes 204 are aligned in the same direction on a $SiO_2$ film 211 over a silicon substrate 210, and a source electrode 212, a drain electrode 213, and a gate electrode 214 are formed by photolithography. Then, a high voltage is applied between the source electrode 212 and the drain electrode 213 to break well-conductive carbon nanotubes and allow semiconductive carbon nanotubes to remain. Thus, the MOS transistor is made.

Another application of the carbon nanotubes is to use them as electron sources of field emission displays (FEDs). Carbon nanotubes emit electrons when voltage is applied to them. Many carbon nanotubes are bundled together in the same direction to form an electron emitter, and such electron emitters are two-dimensionally arranged into an FED electron source. Carbon nanotubes have been used in various other applications, and are, in most of the applications, required to be aligned in one direction.

For the alignment of carbon nanotubes, some methods have been disclosed in Japanese Patent Laid-Open Nos. 2000-208026, 2001-93404, 2001-195972, and 2003-197131, and all of which are involved in FED electron sources. In Japanese Patent Laid-Open No. 2000-208026, a material containing carbon nanotubes is encapsulated in a cylinder, and the cylinder is elongated to align the carbon nanotubes in the elongated direction. In Japanese Patent Laid-Open No. 2001-93404 (corresponding U.S. Pat. No. 6,741,017), a conductive paste containing dispersed carbon nanotubes is pressed into many through-holes formed in a ceramic sheet, so that the carbon nanotubes are aligned in a direction perpendicular to the substrate. In Japanese Patent Laid-Open No. 2001-195972, a paste containing dispersed carbon nanotubes is applied to a serrated feature or other physical shapes provided at the surface of a substrate, by screen printing or spin coating. Thus, the carbon nanotubes are aligned in a direction perpendicular to the surface of the substrate. In Japanese Patent Laid-Open No. 2003-197131 (corresponding U.S. Patent Application Publication No. 2003/117065), carbon nanotubes are placed in many small recesses formed in the surface of a metal film to align them in a direction perpendicular to the surface of the metal film.

These methods, however, have disadvantages as follows. The method disclosed in Japanese Patent Laid-open No. 2000-208026 requires complicated production steps for alignment. Furthermore, in order to use the aligned carbon nanotubes for an FED electron source, the method requires additional steps to array the aligned carbon nanotubes in a matrix, thus increasing the number of production steps. The methods of Japanese Patent Laid-Open Nos. 2001-93404 and 2001-195972 have difficulty in readily aligning carbon nanotubes. Also, the method disclosed in Japanese Patent Laid-Open No. 2003-197131 has a disadvantage in precision of alignment because in the method carbon nanotubes pointing to random directions are simply placed in recesses.

SUMMARY OF THE INVENTION

The present invention is directed to a liquid discharge apparatus for easily aligning needle-like structures and a method for aligning the needle-like structures. The needle-like structures are suspended in a disperse medium.

In one aspect, a liquid discharge apparatus includes a nozzle having an entrance and a discharge opening through which the disperse liquid containing the needle-like structures is discharged. The nozzle is tapered in such a manner that a diameter of the nozzle decreases from the entrance towards the discharge opening. Furthermore, the diameter of the entrance is larger than the length of the needle-like structures, and the diameter of the discharge opening is larger than the diameter of the needle-like structures and smaller than the length of the needle-like structures. In another aspect, a method for aligning the needle-like structures includes the steps of: providing a substrate in which the needle-like structures are to be aligned; providing the nozzle as described above; and discharging the disperse liquid containing the needle-like structures through the discharge opening of the nozzle onto the substrate.

Further features and advantages of the present invention will become apparent from the following description of the embodiments (with reference to the attached drawings).

DESCRIPTION OF THE EMBODIMENTS

Embodiments of the present invention will now be described with reference to the drawings.

First Embodiment

The present embodiment uses carbon nanotubes as representatives of needle-like structures.

Figure 1:
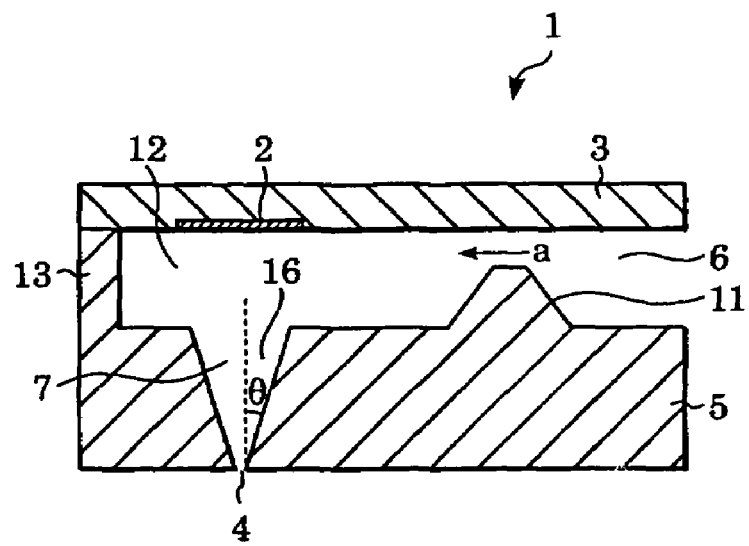
FIG. 1 is a sectional side view of a carbon nanotube feeding head being a major part of a carbon nanotube feeding apparatus serving as a liquid discharge apparatus according to a first embodiment.

FIG. 1 is a sectional side view of a carbon nanotube feeding head 1 being a major part of a carbon nanotube feeding apparatus serving as a liquid discharge apparatus according to the present embodiment.

The carbon nanotube feeding head 1 discharges a disperse liquid in which carbon nanotubes are dispersed to apply it to a substrate in which the carbon nanotubes are to be aligned.

The carbon nanotube feeding head 1 includes a heater 2 serving to generate discharge energy for discharging a disperse liquid 14 (see FIG. 2) in which carbon nanotubes 15 are dispersed/suspended. The heater 2 is an electrothermal converter for converting electrical energy into thermal energy and for allowing the thermal energy to act on the disperse liquid 14. The heater 2 is disposed in a heater board 3. The heater board 3 is joined to a orifice plate 5 having a downstream wall 13 and a hole serving as a nozzle 7. The nozzle 7 includes an entrance and a discharge opening 4. The heater board 3 and the orifice plate 5 define a flow path 6. The disperse liquid 14 containing the carbon nanotubes 15 are discharged through the discharge opening 4.

The flow path 6 communicates with the discharge opening 4 through the nozzle 7, and also communicates with a disperse liquid feeding chamber, not shown in the figure. The disperse liquid feeding chamber feeds to the flow path 6 an amount of the disperse liquid 14 substantially equal to that discharged from the discharge opening 4. Specifically, the disperse liquid 14 containing the carbon nanotubes 15 flows into the flow path 6 in the direction designated by arrow a shown in FIG. 1 from the disperse liquid feeding chamber.

The carbon nanotube feeding head 1 has a bubble-generating region 12 where the heater 2 rapidly heats up to generate bubbles in the disperse liquid 14, in the vicinity of the interface between the heater 2 and the disperse liquid 14.

In the orifice plate 5, which is opposed to the heater board 3, the nozzle 7 is formed in a tapered shape whose diameter decreases toward the discharge opening 4. The nozzle 7 and the discharge opening 4 are provided in a region corresponding to the bubble-generating region 12. The carbon nanotubes 15 usable in the present embodiment, can have diameters in the range between several nanometers to several tens of nanometers and a length in the range between several micrometers to several tens of micrometers. In order to align the carbon nanotubes 15, the nozzle 7 has the discharge opening 4 with a diameter larger than that of the carbon nanotubes 15 and smaller than the length of the carbon nanotubes 15. The diameter of the discharge opening 4 is preferably about 3 to 100 times larger than the carbon nanotubes 15. More preferably, it is several to tens of times larger, specifically about 3 to 30 times larger, than the carbon nanotubes 15. The maximum diameter of the nozzle 7 or tapered opening is larger than the length of the carbon nanotubes 15 and the taper angle θ, designated by reference numeral 16, (e.g., 30° or less). As the taper angle 16 is reduced, alignment capability is increased. The present embodiment uses carbon nanotubes having a diameter of about 20 nm and a length of about 20 μm. Accordingly, the diameter of the discharge opening 4 is several hundreds of nanometers and that the maximum diameter of the nozzle 7 is several tens of micrometers. In the present embodiment, the discharge opening 4 is about 300 nm and the maximum diameter of the nozzle 7 is about 30 μm. The nozzle 7 is formed so as to have such dimensions by photolithography under defocus conditions.

The orifice plate 5 has a back regulator portion 11 upstream from the bubble-generating region 12. The back regulator portion 11 partially reduces the cross section of the flow path 6 to increase flow resistance, thus preventing the bubbling energy of the disperse liquid 14 from escaping. Consequently, the disperse liquid 14 can be efficiently discharged. The downstream side from the bubble-generating region 12 is closed by the downstream wall 13.

The discharge operation of the carbon nanotube feeding head 1 will now be described.

Figure 2:
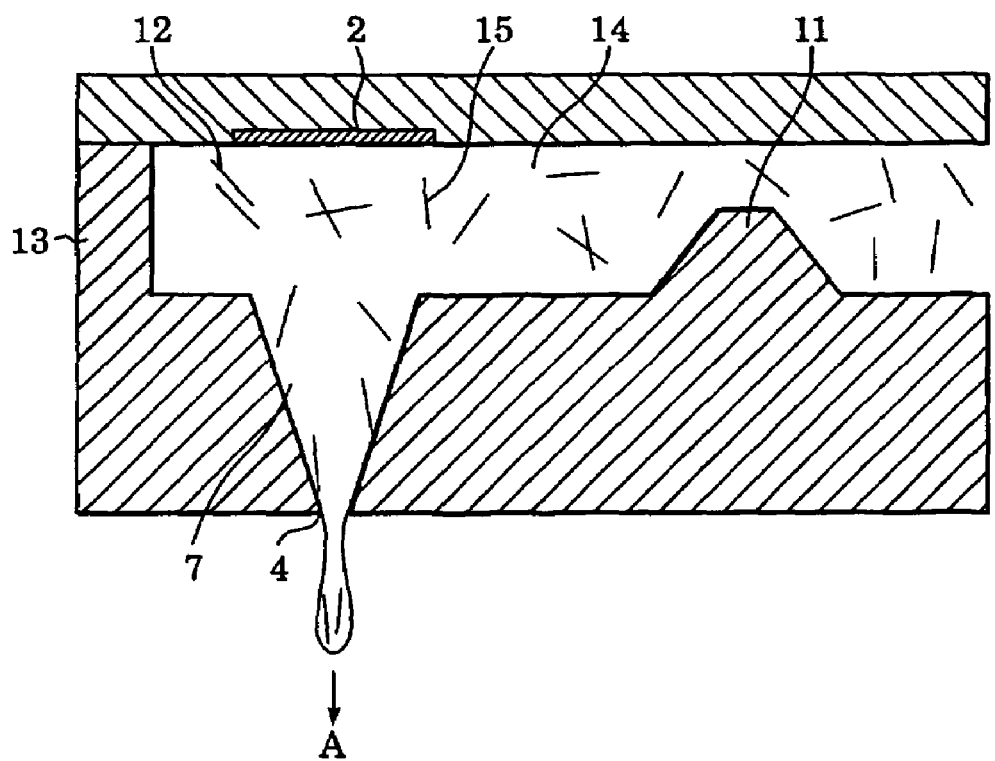
FIG. 2 is a schematic illustration of a disperse liquid in which carbon nanotubes are dispersed, being about to be discharged from a discharge opening of the carbon nanotube feeding head shown in FIG. 1.

FIG. 2 is a schematic illustration of the disperse liquid 14 in which the carbon nanotubes 15 are dispersed, being about to be discharged from the discharge opening 4.

Electrical energy is applied to the heater 2 from a controller (not shown), so that the heater 2 heats up to generate bubbles (not shown) in the disperse liquid 14 in contact with the heater 2. Pressure resulting from the generation of the bubbles in the bubble-generating region 12 forces the disperse liquid 14 in the flow path 6 to move to the nozzle 7 and the downstream and upstream sides. In this instance, the downstream flow of the disperse liquid 14 is blocked by the downstream wall 13, and the upstream flow of the disperse liquid 14 is resisted to reduce the flow rate by the back regulator portion 11. As for the stream toward the nozzle 7, the flow resistance is increased because the nozzle 7 is tapered in such a manner that its diameter decreases toward the discharge opening 4. However, the presence of the downstream wall 13 and the back regulator portion 11 helps the disperse liquid 14 flow into the nozzle 7. Since the nozzle 7 is tapered, the carbon nanotubes 15 in the disperse liquid 14 flowing to the discharge opening 4 are gradually aligned.

Since the diameter of the discharge opening 4 is larger than that of the carbon nanotubes 15 and smaller than the length of the carbon nanotubes 15, as described above, the carbon nanotubes 15 in the disperse liquid 14 are aligned in the discharge direction designated by arrow A when they pass through the discharge opening 4.

The distance between the discharge opening 4 and a substrate is as short as possible, and specifically so short that droplets of the disperse liquid 14 from the discharge opening 4 land on the substrate before being formed into near spheres by surface tension. The reason for this is as follows:

Although the carbon nanotubes 15 in the disperse liquid 14 are not aligned in the flow path 6, they are gradually aligned by the taper of the nozzle 7 and discharged in a state of alignment in the discharge direction A. The disperse liquid 14 immediately after being discharged is elongated in the discharge direction A, and the carbon nanotubes 15 in the liquid are aligned in the discharge direction A accordingly. While the carbon nanotubes 15 aligned in the disperse liquid 14 keep the disperse liquid 14 elongated in the discharge direction A, the disperse liquid 14 tends to form into a sphere due to surface tension. Consequently, the carbon nanotubes 15 aligned in the discharge direction A can undesirably point in random directions. In order to apply the disperse liquid 14 onto the substrate with the carbon nanotubes 15 aligned, the distance between the substrate and the carbon nanotube feeding head 1 is as short as possible so that the disperse liquid 14 lands onto the substrate before being formed into a sphere by the effect of surface tension.

In order to prevent the carbon nanotubes 15 in the disperse liquid 14 from sinking, the controller may apply electrical energy to the heater 2 at a time other than when the disperse liquid 14 is discharged. This is because the sunken carbon nanotubes 15 clog the nozzle 15 or the discharge opening 4, accordingly degrading capability to discharge the disperse liquid 14. For preventing such clogging, the controller applies electrical energy to the heater, for example, intermittently to such an extent as to repeat a sequence of generation and disappearance of fine bubbles, but not such an extent as to allow the discharge liquid 14 to discharge. More specifically, the heater 2 is used as a vibration mechanism to pulse the disperse liquid 14. Thus, the carbon nanotubes 15 are prevented from sinking and capability to discharge the disperse liquid 14 is maintained. Alternative to using the heater 2 both to discharge the disperse liquid 14 and to prevent the carbon nanotubes 15 from sinking, an electrothermal converter having the same mechanism as the heater 2 may be additionally provided in the flow path 6 for preventing carbon nanotubes from sinking.

The carbon nanotube feeding apparatus may further include a recovery mechanism for recovering capability to discharge the disperse liquid 14. The disperse liquid 14 trapped in the nozzle 7 evaporates, so that the viscosity of the liquid is increased to degrade the discharge capability. Also, repetition of discharge causes residual bubbles to occur in the nozzle 7 and the flow path 6, consequently degrading the discharge capability. The recovery mechanism applies positive or negative pressure to the disperse liquid 14 in the flow path 6 to remove the disperse liquid 14 clogging the nozzle 7 and the residual bubbles. The recovery mechanism may be disposed upstream of the flow path 6 so as to apply positive pressure to the disperse liquid 14 in the flow path 6 to eject the disperse liquid 14 clogging the discharge opening 4, or apply negative pressure by suction to draw the clogging disperse liquid 14 or residual bubbles to the upstream side. In such a structure, the recovery mechanism may alternately apply positive and negative pressures to the disperse liquid 14 so as to recover the discharge capability and to prevent the carbon nanotubes 15 from sinking. Alternatively, the recovery mechanism may be provided outside the carbon nanotube feeding head 1. In this instance, the recovery mechanism is directly put to the discharge opening 4, and draws the clogging liquid 14 and residual bubbles by suction to remove them.

The heater 2 may be used as the recovery mechanism. Specifically, the heater 2 serving as the vibration mechanism may pulse the disperse liquid 14 so as to recover the discharge capability.

Since, in the present embodiment, the disperse liquid 14 is discharged by generating bubbles, the disperse medium of the disperse liquid 14 is a material having a relatively low viscosity, such as a solvent. In the present embodiment, disperse media which have relatively high viscosities but are capable of being discharged by ink jetting are referred to as pastes. If a paste, such as conductive paste or an insulating resin paste, is used as the disperse medium, the carbon nanotube feeding head includes a piezoelectric element, as described below.

Figure 3:
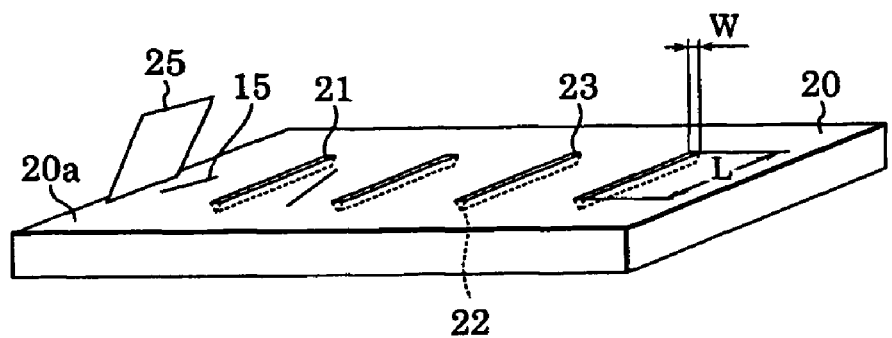
FIG. 3 is a perspective view of a substrate in which carbon nanotubes are to be aligned.

FIG. 3 shows a substrate 20 in which carbon nanotubes are to be aligned.

In FIG. 3, the substrate 20 has a plurality of grooves 21, or recesses, formed in its surface. The material of the substrate 20 is not particularly limited, and the substrate 20 may be made of insulating material, such as ceramic or resin, or semiconductive or conductive material, such as silicon wafer or metal. Also, the substrate 20 may comprise silicon covered with an oxide layer, such as a $SiO_2$ film. Any material may constitute the substrate 20, as long as flatness is ensured at the surface of the substrate 20.

The grooves 21 have V-shaped cross sections whose vertexes point down and are formed in the substrate 20 substantially in parallel with each other at predetermined intervals. The grooves 21 are intended for use to align carbon nanotubes 15. The carbon nanotubes 15 are placed in the grooves 21 along the sidewalls 22 of the grooves 21, as described later, thereby being aligned. Therefore, the width w of the opening of the grooves 21 is set larger than the diameter of the carbon nanotubes 15 so that the carbon nanotubes 15 can be placed in the grooves 21. Also, in order for the carbon nanotubes 15 to align along the sidewalls 22 of the grooves 21, the width w is set smaller than the length of the carbon nanotubes 15.

While FIG. 3 illustrates V-shaped grooves by way of example, the grooves 21 may have any shape allowing the carbon nanotubes 15 to align. For example, the section of the grooves 21 may be rectangular, trapezoidal, semicircular, or semioval. Since the cross section of the grooves 21 is V-shaped in the present embodiment, the carbon nanotubes 15 are aligned along the sidewalls 22 of the grooves 21. If the cross section is, for example, rectangular, however, the carbon nanotubes 4 may be aligned along the bottoms of the grooves 21. In other words, the grooves 21 have any shape as long as the carbon nanotubes 15 can be aligned along their inner walls.

The carbon nanotubes 15 usable in the present embodiment have diameters in the range between several nanometers to several tens of nanometers and lengths in the range between several micrometers to several tens of micrometers, as described above. The present embodiment uses carbon nanotubes having a diameter of about 20 nm and a length of about 20 μm. Accordingly, it may suffice that the width w of the grooves 21 is set less than the length of carbon nanotubes, 20 μm. From the viewpoint of enhancing the alignment capability, however, the width w is set about tens times the diameter of the carbon nanotubes 15 and that the length L of the grooves 21 set about 1.2 times the length of the carbon nanotubes 15. In the present embodiment, the grooves 21 have a width w of about 500 nm and a length L of about 25 μm. The length L of the grooves 21 may be longer because it may be cut according to the application after alignment. For an FED electron source, the grooves 21 can have a width W of about 500 nm and a length L of about 1 mm. While the present embodiment illustrates grooves 21 having a smaller length L than the longitudinal length of the substrate 20, the length L may be the same as the longitudinal length of the substrate 20.

The grooves 21 may be formed by ion beams, electron beams, or light beams with a wavelength shorter than or equal to that of visible light, or by rubbing. If the substrate 20 is a silicon wafer, the grooves 21 may be formed by dry etching or anisotropic etching.

The disperse liquid 14 containing the carbon nanotubes 15 is discharged into the grooves 21 formed in the substrate 20 as described above from the carbon nanotube feeding apparatus of the present embodiment. The discharge may be performed while the nozzle 7 is moved in the longitudinal direction of the grooves 21. The disperse liquid 14 discharged into the grooves 21 is swept to spread uniformly with a squeegee 25. In this step, the carbon nanotubes 15 in the disperse liquid 14 overflowing from the grooves 21 are swept to drop into the adjacent grooves 21 with the squeegee 25. If the carbon nanotube feeding apparatus applies the disperse liquid 14 to an area other than the grooves 21, the liquid 14 is dropped into the grooves 21 by sweeping with the squeegee 25.

The disperse liquid 14 outside the grooves 21 may be scraped by sweeping the surface 20a having the grooves 21 of the substrate 20 with the squeegee 25 and reused.

For aligning the carbon nanotubes 15 in the grooves 21 formed in parallel with each other, along the length of the grooves 21, as shown in FIG. 3, the carbon nanotubes 15 may be discharged in a direction of several to tens of degrees with respect to the surface of the substrate 20, but the discharge direction is not particularly limited. More specifically, the discharge direction is set at such an angle that the alignment of the carbon nanotubes 15 is not broken by collision of the carbon nanotubes 15 with the internal walls of the grooves 21, that is, at an angle of 90° or less with respect to the surface of the substrate 20.

By adopting the apparatus and the method of the present invention, previously aligned carbon nanotubes are fed into grooves or recesses formed in a substrate, and carbon nanotubes fed to areas other than the grooves are reused without being wasted.

Figure 4:
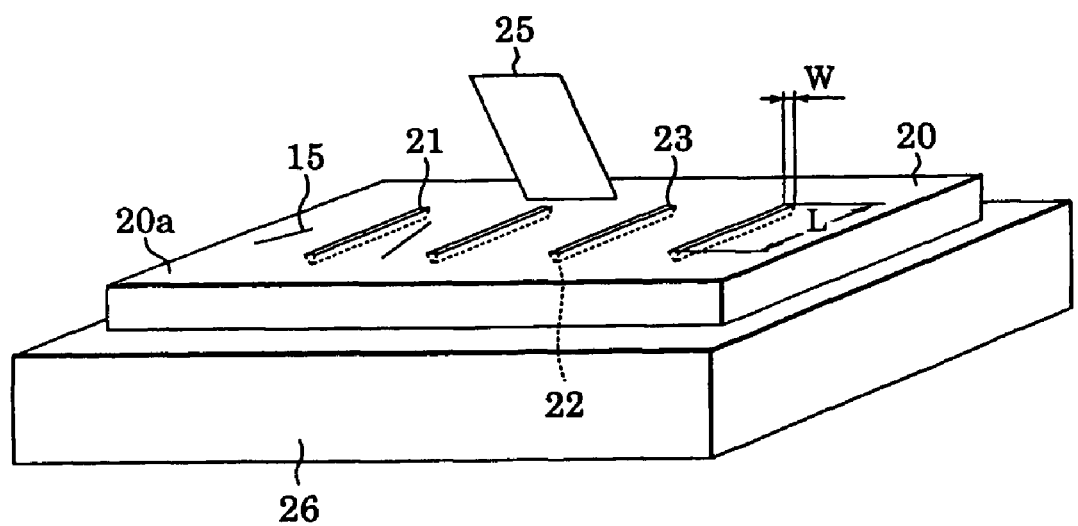
FIG. 4 is a perspective view of a substrate in which carbon nanotubes are to be aligned.

FIG. 4 shows the substrate 20 provided on a stage 26 and the squeegee 25 moves in a different direction from the direction shown in FIG. 3.

For dropping the carbon nanotubes 15 into the grooves 21, the squeegee 25 may be moved in any direction without limitation. However, However, it is effective that the squeegee 25 positioned substantially perpendicular to the longitudinal direction of the grooves 21 is reciprocated substantially parallel to the longitudinal direction of the grooves 21, as shown in FIG. 4, in comparison with the case where the squeegee 25 positioned substantially parallel to the longitudinal direction of the grooves 21 is reciprocated in the direction perpendicular to the longitudinal direction of the grooves 21. This is because the reciprocation in the longitudinal direction of the grooves 21 reduces the probability of removing the carbon nanotubes 15 in the grooves 21 and facilitates the collection of carbon nanotubes 15 left on the surface 20a of the substrate 20 without being aligned in the grooves 21.

Since, in the present embodiment, the carbon nanotubes 15 are dispersed in a disperse medium having a relatively low viscosity, such as solvent, so that the disperse liquid 14 can be easily discharged by generating bubbles, a heating step can be performed to remove the disperse medium from the liquid 14. Additionally, a sequence of the steps of applying the disperse liquid 14 containing the carbon nanotubes 15, of sweeping the surface 20a having the grooves 21, and of heating the disperse liquid 14 is repeated so that the carbon nanotubes 15 can be closely placed in the grooves 21. The heating may be performed on the substrate 20 with, for example, a heater contained in the stage 26 supporting the substrate 20 or an external heating device.

Thus, an alignment unit in which the carbon nanotubes 15 are aligned is prepared. The alignment unit is provided with a source electrode, a drain electrode, and a gate electrode by photolithography or ink jetting, and thus a MOS transistor is produced.

Figure 5:
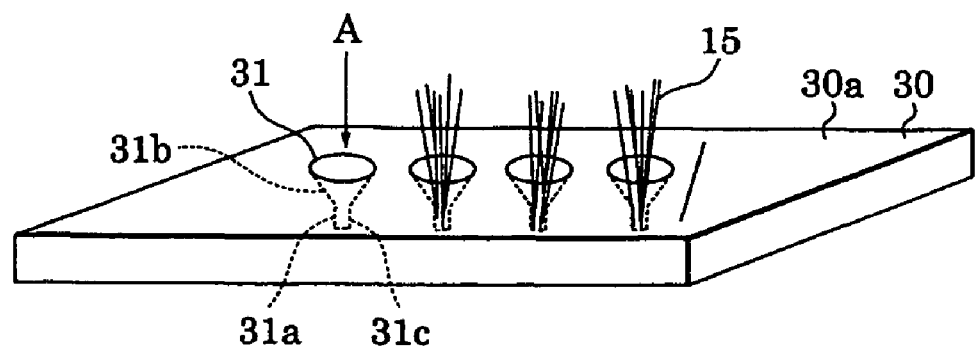
FIG. 5 is a perspective view of a substrate in which carbon nanotubes are to be aligned.

FIG. 5 shows another substrate in which carbon nanotubes are to be aligned.

While the substrates shown in FIGS. 3 and 4 have the grooves 21 formed in parallel with the surface 20a of the substrate 20, a substrate 30 shown in FIG. 5 has a plurality of recesses 31, each defined by a conical opening 31b and a cylindrical holder 31c communicating with a conical opening 31b. The recesses 31 of the substrate 30 in FIG. 5 are also intended for use to align carbon nanotubes 15 as in the cases shown in FIGS. 3 and 4, and the carbon nanotubes 15 are aligned by placing the recesses 30. However, the case shown in FIG. 5 is different from that shown in FIGS. 3 and 4 in that the carbon nanotubes are aligned substantially perpendicularly to the surface 30a of the substrate 30 along the internal walls of the holders 31c, while the carbon nanotubes 15 in FIGS. 3 and 4 are aligned substantially in parallel with the surface 20a of the substrate 20.

The opening 31b and the holder 31c have diameters larger than that of the carbon nanotubes 15, and the diameter of the holder 31c is smaller than the length of the carbon nanotubes 15.

The recesses 31 shown in FIG. 5 have a conical shape and the carbon nanotubes enter the recesses 31 from the larger diameter side of the conical shape. However, the recesses 31 are not particularly limited to such a shape and may be defined by only the holder 31c, that is, may be simply cylindrical.

In recycling carbon nanotubes 15 remaining on the surface 30a of the substrate 30, carbon nanotubes 15 with lengths smaller than the depth of the recesses 31 can be collected by sweeping with a squeegee. For carbon nanotubes 15 with lengths larger than the depth of the recesses 31, the surface 30a of the substrate 30 can be flushed with pure water to wash away the carbon nanotubes 15. The carbon nanotubes 15 flushed out are collected for recycling with collecting means, not shown in the figure.

In order to closely place the carbon nanotubes 15 in the recesses 31, a heating step may be performed to evaporate and remove the disperse medium or solvent after the step of placing the carbon nanotubes 15 in the recesses 31.

Figure 6:
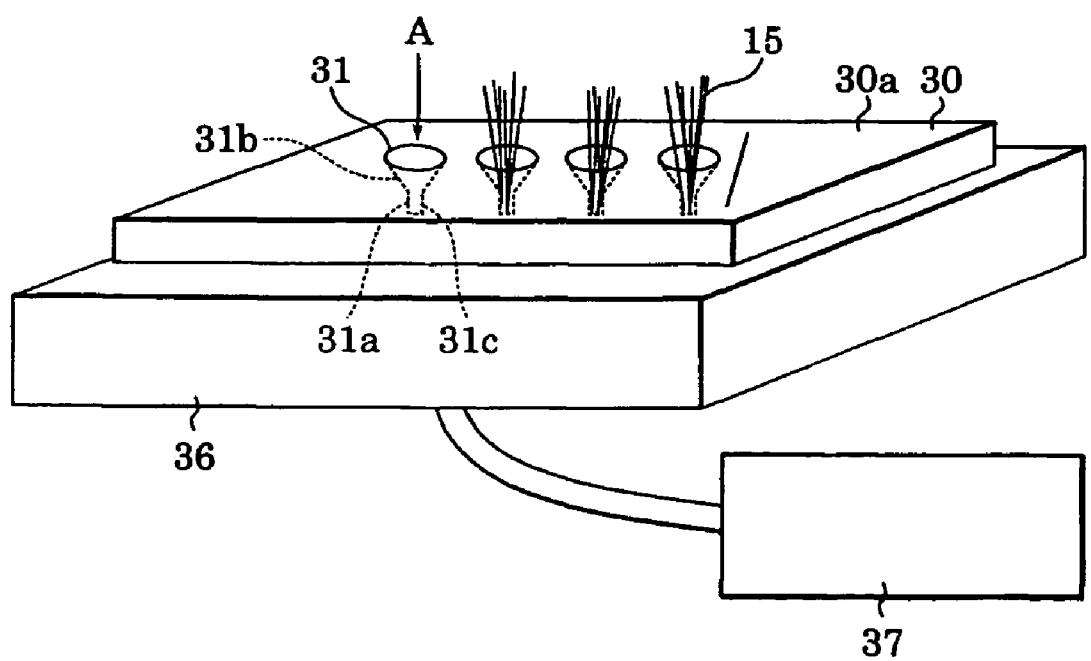
FIG. 6 is a perspective view of a substrate in which carbon nanotubes are to be aligned and which is provided with suction means.

FIG. 6 shows that the carbon nanotubes 15 can be more closely placed substantially perpendicular to the substrate.

The recesses 31 shown in FIG. 6 are formed in the same shape as in FIG. 5, except that the recesses 31 of FIG. 6 pass through the bottom of the substrate 30.

Suction mechanism 37 is provided to the stage 36 supporting the substrate 30, and the suction mechanism 37 slowly draws the disperse liquid containing carbon nanotubes from the stage side of the substrate 30 to repeatedly apply the disperse liquid into the recesses 31. The stage 36 can be made of porous ceramic. The suction mechanism 37 is, for example, a vacuum pump. Since the suction pressure generally depends on the diameter and length of the carbon nanotubes 15 and the shape of the recesses 31 (including the diameter), it is determined by varying conditions, and suction is performed at the determined pressure.

In the present embodiment, the carbon nanotubes 15 contained in the disperse liquid 14 are discharged through the discharge opening 4 of the carbon nanotube feeding head 1, having a diameter larger than that of the carbon nanotubes 15 and smaller than the length of the carbon nanotubes 15, thereby aligning in the discharge direction A.

In use of a substrate having grooves or recesses, the carbon nanotubes can be directly fed in the grooves or recesses, and consequently, waste of carbon nanotubes 15 can be reduced. In addition, since the disperse liquid is fed with the carbon nanotubes 15 aligned in advance, the alignment of the carbon nanotubes 15 can be further improved.

Second Embodiment

Figure 7:
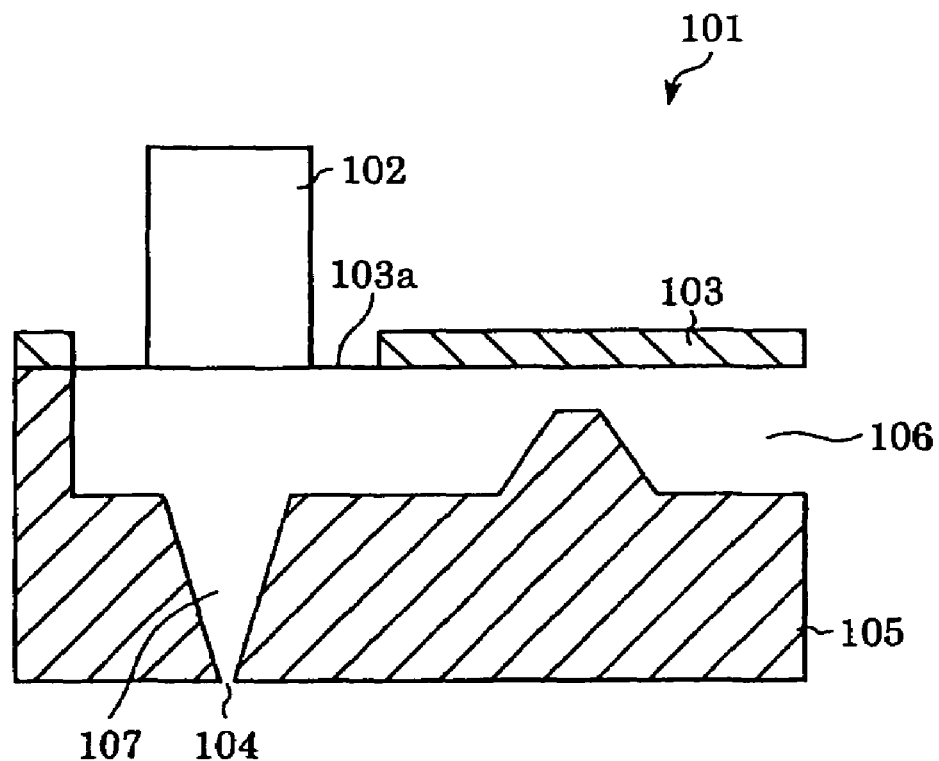
FIG. 7 is a sectional side view of a carbon nanotube feeding head being a major part of a carbon nanotube feeding apparatus serving as a liquid discharge apparatus according to a second embodiment.
Figure 8:
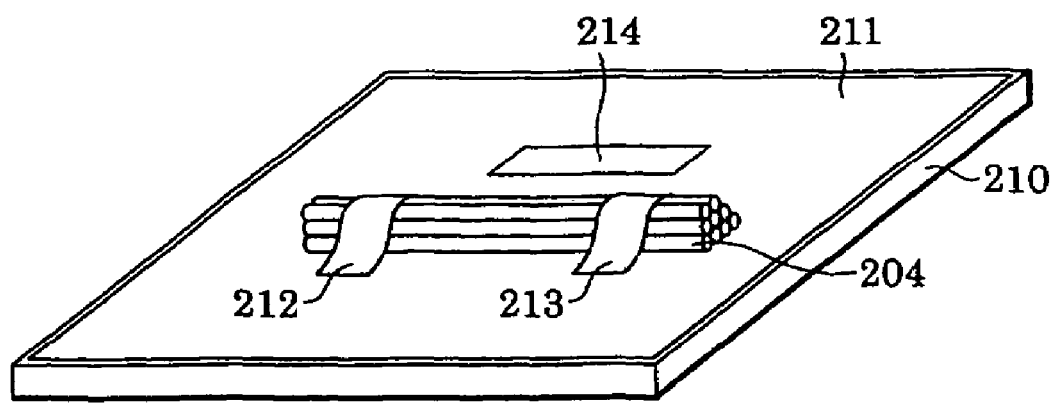
FIG. 8 is a schematic illustration of a known MOS transistor.

FIG. 7 is a sectional side view of a carbon nanotube feeding head 101 being a major part of a carbon nanotube feeding apparatus serving as a liquid discharge apparatus according to the present embodiment.

The carbon nanotube feeding head 101 of the present embodiment includes a heater board 103, a orifice plate 105 having a nozzle 107 with a discharge opening 104, and a vibration plate 103a having a piezoelectric element 102 in a position corresponding to the nozzle 107 and the discharge opening 104.

While the carbon nanotube feeding head 1 of the first embodiment discharges the disperse liquid by pressure resulting from bubble generation, the carbon nanotube feeding head 101 of the present embodiment discharges the disperse liquid from the discharge opening 104 by pressure resulting from distortion of the vibration plate 103a which is caused by expansion of the piezoelectric element 103a by applying an electrical signal.

Since other parts of the carbon nanotube feeding head 101 are the same as in the first embodiment, and the head 101 discharges the disperse liquid onto the same substrate in the same manner, the description is not repeated.

If a conductive paste, which is prepared by, for example, dispersing metal particles in a solvent, is used as the disperse liquid, a heating step can be performed after the step of applying the disperse liquid. The heating can sinter the metal particles to enhance the conductivity.

In the present embodiment, the carbon nanotubes contained in the disperse liquid are discharged through the discharge opening 104, having a diameter larger than that of the carbon nanotubes and smaller than the length of the carbon nanotubes, thereby aligning in the discharge direction of the carbon nanotubes, as in the first embodiment.

In use of a substrate having grooves or recesses, the carbon nanotubes can be directly fed in the grooves or recesses, and consequently, waste of carbon nanotubes can be reduced. In addition, since the disperse liquid is fed with the carbon nanotubes aligned in advance, the alignment of the carbon nanotubes can be further improved.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A liquid discharge apparatus for discharging a disperse liquid containing a plurality carbon nanotubes, the carbon nanotubes having a length and a diameter, the liquid discharge apparatus comprising:

a nozzle having an entrance and a discharge opening through which the disperse liquid containing the carbon nanotubes is discharged;

an electrothermal converter for discharging the disperse liquid as an independent droplet from the discharge opening by applying energy to the disperse liquid and generating bubbles in the disperse liquid; and a controller to apply electrical energy to the electrothermal converter, wherein the controller is configured to:

apply first electrical energy to the electrothermal converter that is sufficient to generate bubbles in the disperse liquid and discharge the disperse liquid from the discharge opening; and at a time other than when the disperse liquid is being discharged from the discharge opening, intermittently apply second electrical energy that is smaller than the energy applied in discharging of the disperse liquid, to generate a plurality of bubbles in the disperse liquid and to vibrate the disperse liquid in the nozzle without discharging the disperse liquid from the discharge opening, the nozzle being tapered in such a manner that a diameter of the nozzle decreases from the entrance towards the discharge opening, and wherein the diameter of the entrance is larger than the length of the carbon nanotubes, and the diameter of the discharge opening is larger than the diameter of the carbon nanotubes and smaller than the length of the carbon nanotubes.

2. The liquid discharge apparatus according to claim 1, wherein the nozzle has a taper angle of 30° or less.

3. The liquid discharge apparatus according to claim 1, wherein the diameter of the discharge opening is about 3 to 30 times larger than the diameter of the carbon nanotubes.

4. The liquid discharge apparatus according to claim 1, further comprising a recovery unit configured to apply at least one of a positive and a negative pressure to the disperse liquid in the nozzle so as to recover a discharge capability of the disperse liquid.

5. The liquid discharge apparatus according to claim 1, further comprising a recovery unit provided at about the discharge opening, the recovery unit configured to draw the disperse liquid by suction through the discharge opening so as to recover a discharge capability of the disperse liquid.

* * * * *